Aug. 10, 1954  J L. STEPHANS  2,686,067
CONCEALED SWIVEL JOINT
Filed March 18, 1950
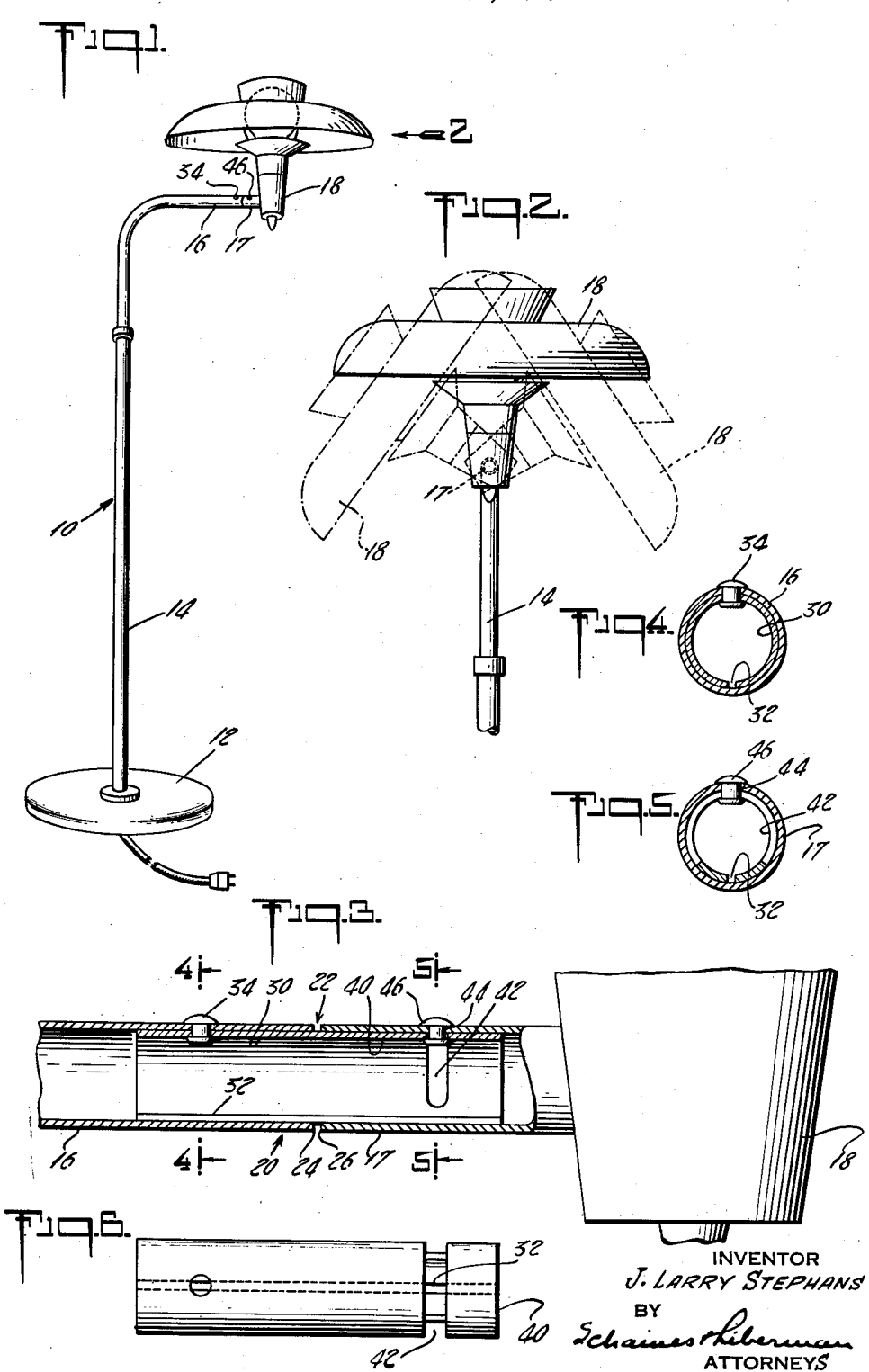
INVENTOR
J. LARRY STEPHANS
BY
Schaines Lieberman
ATTORNEYS Patented Aug. 10, 1954

2,686,067

UNITED STATES PATENT OFFICE 2,686,067

CONCEALED SWIVEL JOINT

J Larry Stephans, St. Albans, N. Y., assignor, by mesne assignments, to International Projector Corporation, Bloomfield, N. J., a corporation of Delaware Application March 18, 1950, Serial No. 150,497

3 Claims. (Cl. 285—161)

The present invention relates generally to article supports, and in particular it relates to swivel joints in article supports whereby the article being supported may be turned or swivelled, as desired, through a substantial amount of arc short of 360°. While I will describe and illustrate the device of the present invention as applied to and incorporated within an article support as a lamp stand, it is to be understood that the device has other applications, and the scope of the invention is not to be limited except by the claims annexed hereto.

The main object of the present invention is the provision of a concealed swivel joint in an article support member; that is, a device permitting swivelling of one portion of the support with respect to an associated portion, which device does not materially alter the surface appearance of the support member.

Another object of the present invention is the provision of a concealed swivel joint in an article support which comprises a tube telescopically disposed within and fixed to one portion of the support, on which tube the adjacent portion of the support is fixed and trapped for limited rotation thereabout.

Another object of the present invention is the provision of a swivel joint between parts of an article support member comprising a tube, a portion of which tube is telescopically and nonrotatably disposed and secured within one part of the article support, the other portion of the tube being telescopically and rotatably disposed within the adjacent part of the support.

Other and further objects of the present invention are the provision of a swivel joint between parts of an article support member comprising a longitudinally split tube having a transversely extending slot therethrough adjacent an end thereof, the slot extending through a degree of arc less than 360° and short of the longitudinal split; wherein the tube end remote from the slot is telescoped and fixed within one part of the article support with the slotted end telescoped and rotatably disposed within the other part of the support; and wherein the slotted end of the tube is held against withdrawal from the said other part of the support by a rivet through the slot; permitting rotation of the said other part along the length of the slot.

Still other and further objects of the present invention will in part be obvious and in part will be specifically pointed out in the following description of an illustrative embodiment thereof.

In the drawings annexed hereto, and forming a part hereof,

Figure 1 is a perspective view of an electric light stand incorporating the swivel joint of the present invention;

Figure 2 is an enlarged view of the head portion thereof as seen in the direction of the arrow 2 of Figure 1 illustrating the swivel action resulting from my device;

Figure 3 is an enlarged section through a swivel joint assembly constructed according to and embodying the present invention, as incorporated in the support stand of Figures 1 and 2, a portion of the supported article being shown in side elevation.

Figure 4 is a section on the line 4—4 of Figure 3;

Figure 5 is a section on the line 5—5 of Figure 3; and

Figure 6 is an elevational view of the sleeve component of the swivel joint of the present invention.

The support and supported article are indicated generally by reference numeral 10, including a base 12, and an upright 14, said upright being provided, as shown, with an offset arm 16, at the end of which arm 16 an article as electric light fixture 18 is secured and supported. As will be obvious from the following, the supported article need not be mounted on an offset portion of the support. It is necessary only that the portion of the support wherein the swivel of the present invention is located be of circular section and hollow, in order to receive the swivel mechanism.

The swivel, indicated generally by reference numeral 20 (see Figure 3) is disposed between adjacent portions of the support component, preferably close to the article being supported, in this case, a light fixture 18. Portions of the support member 16 are separated at 22, the proximate ends 24, 26 of the adjacent portions of the support being close together.

A relatively short hollow tubular member 30 is provided, having a lengthwise extending split 32, of such diameter as to fit table snugly and telescopically within the open hollow end 24 of one portion of support 16. Only a part of tube 30 extends into member 16, as seen in Figure 3. The splitting of tube 30 at 32 permits the contraction thereof and easier insertion into member 16. Upon release of the contractile force, tube 30 will expand against and grip the inner surface of support 16. However, to insure that tube 30 is positively fixed against any rotation relative to member 16 and against any relative lengthwise movement, a rivet 34 is provided and threaded through registering openings through support 16 and tube 30. The rivet is upset at both ends thereof to clinch tube 30 to support 16. The extending part 40 of tube 30 has formed therein a transversely extending track or channel 42 which extends about tube 30 a degree of arc less than 360° and short of the split 32, as to avoid weakening same. Tube extension 40 is telescoped within support portion 17 and track or channel 42 is aligned with an opening 44 in said portion 17. A rivet 46 passing through opening 44 and channel 42 serves to lock support 17 to tube 30 while permitting swivelling movement of portion 17 along track 42 with respect to portion 16 of the support. The expansile force of split tube end 40 against the inner surface of member exerts a friction grip sufficiently strong as to hold support portion 17 in any position relative to portion 16 to which it is swivelled, as indicated by the dotted lines in Figure 2.

The openings for rivets 34, 46 in the support components 16, 17 may be aligned when the support is in the normal or usual position, although this is not necessary. The outer head ends of rivets 34, 46 may be small, or may be countersunk. Thus, with the ends 24, 26 of the support 16 placed closely together, the line of separation is relatively unnoticeable, so that the swivel joint is concealed, so to speak, and out of sight.

The addition to an ordinary article support of the joint of the present invention requires merely the tube 30 and rivets 34, 46. The amount of labor required for its installation is very slight, as will be obvious from the foregoing. The distance between the joint and the article, as 18, being supported, is relatively short to eliminate torque strains on the interposed portion of the support.

Having now described my invention, what I claim and desire to secure by Letters Patent is:

1. A concealed swivel joint in an article support comprising a pair of end-butted and axially aligned, uniformly dimensioned, hollow, tubular support members, a short tube wholly disposed within and substantially overlaid and hidden by said butted tubular support members, one end of the short tube being telescopically and nonrotatably disposed and secured within one of the support members, the other end of said short tube being telescopically disposed within the other of the support members, said other of the support members being rotatable about the short tube, and means associated with the short tube and said other of the support members to permit rotational movement of said other support members about the short tube and to prevent axial displacement of the butted support members.

2. A concealed swivel joint as in claim 1, wherein the last referred to means comprise a pin-and-slot connection between the said other of the support members and the interposed short tube.

3. A concealed swivel joint as in claim 2, wherein the short tube is transversely slotted through less than 360° of arc, and the pin extends from the said other support member into the slot.

References Cited in the file of this patent

UNITED STATES PATENTS

| Number | Name | Date |
|---|---|---|
| 770,898 | Fenstermacher | Sept. 27, 1904 |
| 933,132 | Smith | Sept. 7, 1909 |
| 960,723 | Smith | June 7, 1910 |
| 1,441,045 | Tredwell | Jan. 2, 1923 |
| 1,713,993 | Campi | May 21, 1929 |
| 2,216,408 | Elmer | Oct. 1, 1940 |
| 2,220,215 | Cloutier | Nov. 5, 1940 |

FOREIGN PATENTS

| Number | Country | Date |
|---|---|---|
| 474,459 | Great Britain | Nov. 2, 1937 |